Patented June 28, 1927.

1,633,621

UNITED STATES PATENT OFFICE.

JOSEPH BLUMENFELD, OF LONDON, ENGLAND.

FILTRATION OF SOLUTIONS AND THE LIKE.

No Drawing. Application filed July 28, 1924, Serial No. 728,785, and in Great Britain August 3, 1923.

This invention relates to the treatment of solutions which may be termed unfiltrable with a view to rendering the separation therefrom of suspended matter less difficult than heretofore. The solutions obtained from the chemical attack upon minerals or products especially those containing metals of the fourth group such as titanium, zirconium, thorium, tin, contain suspended matter which cannot without great difficulty be separated from the solution in the usual way as by filtering or decanting, and are those to which the invention relates.

The suspended matter referred to may comprise for example insoluble oxides such as $SiO_2$ or any of the various metals originally present in the crude mineral, insoluble and unattacked particles of the mineral in a finely divided state and other colloidal compounds introduced with the acid for example during the attack or resulting from the attack or other causes such as slight hydrolysis.

It has previously been proposed to free a solution containing electro-positive colloids by coagulating therewith electro-negative colloidal sulphur and precipitating sulphur in the solution under oxidizing conditions. This has been effected by the addition of sulphuretted hydrogen or a sulphide in the presence of an oxidizing agent.

The present invention consists in treating solutions containing metallic elements of the fourth group, viz, titanium, zirconium, tin or thorium for the rapid separation of suspended matter defined above therefrom by the precipitation therein of colloidal metallic sulphides, under neutral or reducing conditions, whereby the impurities are precipitated together with the said metallic sulphides, and the solution so clarified. In the present invention the colloidal metallic sulphides are formed by double decomposition within the solution to be clarified, by the addition thereto of suitable substances which react with one another under reducing conditions to produce the said sulphides, and heat may be applied when necessary. The colloidal metallic sulphide formed within the solution carries an electric charge of opposite sign to the charge carried by the suspended matter which it is desired to remove from the solution. The well-known phenomenon of electrical neutralization results and as a consequence the colloidal substances coagulate and settle out from the solution. After precipitation separation is effected by decantation or filtration. The colloidal metallic sulphide chosen for the precipitation must not react with the substances in true solution.

In order that the invention may be understood, specific examples are given:—

*Example I.*

Clarification of a solution of thorium. The said solution may be that produced by the attack of hydrochloric acid on crude hydroxide of thorium, which solution has a density of 33° Bé. and contains 150 grammes of $ThO_2$ per litre. Clarification is effected by adding 3 cm.$^3$ of a solution saturated with copper sulphate to every litre of solution. The whole is well mixed and iron sulphide is then added in a quantity sufficient to completely precipitate the copper in the form of a sulphide while the iron passes into solution to be subsequently removed with the iron originally present in the solution.

The reactions taking place may be represented thus:—

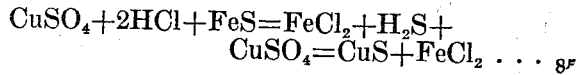

The CuS formed as above carries an electric charge of opposite sign to that carried by the impurities, and as a consequence mutual precipitation results. After a time, the resulting solution is filtered or allowed to stand and the clarified solution decanted from the mixed precipitate of copper sulphide and the impurities.

*Example II.*

Clarification of a solution of titanium. The said solution may be that produced by the attack of sulphuric acid on ilmenite, which has a density of 50° Bé. and contains 200 grammes of $TiO_2$ per litre. Heat is applied to the solution until a temperature of about 50° C. is reached when, for every litre of solution, 0.5 gramme of $As_2O_3$ previously dissolved in water is added. A quantity of iron sulphide sufficient to completely precipitate the arsenic in the form of a sulphide is added.

The reactions taking place may be represented thus:—

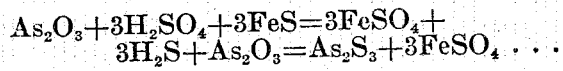

Mutual precipitation occurs as in the previous example. After precipitation, the solution is filtered or allowed to stand and the clarified solution decanted from the mixed precipitate of arsenic sulphide and the impurities.

Having now described my invention, what I claim as new and desire to secure by Letters Patent is:—

1. A process for the clarification of by the removal of suspended matter from solutions which result from chemical attack upon minerals or the like containing metallic elements of the fourth group, said process comprising adding to the solution to be clarified compounds capable of forming by reaction within said solution a colloidal metallic sulphide having an electric charge of opposite sign to that of said suspended matter.

2. A process for the clarification of by the removal of suspended matter from solutions which result from chemical attack upon minerals or the like containing tin, titanium, thorium or zirconium, comprising adding to the solution to be clarified an oxygen compound of a metal whose sulphide is insoluble in said solution, and a metallic sulphur compound capable of liberating $H_2S$ within the solution to precipitate therein the said insoluble sulphide.

3. A process as claimed in claim 1, comprising heating the solution to be treated and adding thereto metallic compounds capable of forming therein by double decomposition a colloidal metallic sulphide, allowing the resulting solution to stand and thereafter decanting or filtering it.

4. A process as claimed in claim 2, comprising heating the solution to be treated and adding thereto metallic compounds capable of forming therein an insoluble colloidal metallic sulphide, allowing the resulting solution to stand and thereafter decanting or filtering it.

5. A process as claimed in claim 2, comprising adding to the solution to be treated a metallic sulphate and iron sulphide, the latter in quantity capable of completely converting by double decomposition the said metallic sulphate into the corresponding metallic sulphide.

6. A process as claimed in claim 2, comprising adding to the solution to be treated a saturated solution of copper sulphate, mixing said solutions together and adding thereto an equivalent quantity of iron sulphide, and thereafter separating the resulting solution and precipitate by filtration or decantation.

7. Solutions obtained by direct chemical attack upon such minerals and products as contain metals of the fourth group and other elements or compounds of which enter and exist in such solutions in a finely divided or colloidal state, characterized by being substantially free from suspended or colloidal matter.

In testimony whereof I have signed my name to this specification.

J. BLUMENFELD.